United States Patent
Yue

(10) Patent No.: US 7,027,485 B2
(45) Date of Patent: Apr. 11, 2006

(54) SIGNAL DISCRIMINATOR FOR A SPREAD SPECTRUM SYSTEM

(75) Inventor: Lin Yue, San Jose, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 689 days.

(21) Appl. No.: 09/792,147

(22) Filed: Feb. 21, 2001

(65) Prior Publication Data

US 2002/0114378 A1 Aug. 22, 2002

(51) Int. Cl.
*H04B 1/69* (2006.01)
*H04B 1/707* (2006.01)
*H04B 1/713* (2006.01)

(52) U.S. Cl. ....................................... 375/147

(58) Field of Classification Search ................ 375/147, 375/346, 231, 348
See application file for complete search history.

(56) References Cited

U.S. PATENT DOCUMENTS

| 5,889,768 | A | | 3/1999 | Storm et al. |
| 6,049,574 | A | | 4/2000 | Noonan et al. |
| 6,052,602 | A | | 4/2000 | Yamamoto |
| 6,085,091 | A | | 7/2000 | Yoo et al. |
| 6,128,331 | A | * | 10/2000 | Struhsaker et al. ......... 375/142 |

FOREIGN PATENT DOCUMENTS

| WO | 98/00999 | 1/1998 |
| WO | 00/35220 | 6/2000 |

OTHER PUBLICATIONS

"Improved type-based detection of analog signals" Johnson, D.H.; Goncalves, P.A.; Baraniuk, R.G.;Acoustics, Speech, and Signal Processing, 1997. ICASSP-97., 1997 IEEE International Conference on , vol.: 5 , Apr. 21–24, 1997 pp.: 3717–3720 vol. 5.*
Lin Yue et al. : Universal Classification for CDMA Communications : Single–User Receivers and Multi–User Receivers, Communications , 1998, ICCC 98. Conference Record. 1998 IEEE International Conference on Atlanta, GA, USA Jun. 7–11, 1998, New York, NY, USA, IEEE, US, Jun. 7, 1998. pp. 748–752.
Lin Yue et al: Signal Detectin on Wirless CDMA Downlink, Vehicular Technology Conference, 1998, VTC May 1998, New York, NY, USA, IEEE, US, May 18, 1998, pp. 2522–2526.
Yuan Kan Lee et al: Type–Based Detection for Spred Spectrum, Communications, 1997. ICC '97 Monteal, Toward the Knowledge Millennium. 1997 IEEE International Conference on Montreal, Que., Canada Jun. 8–12, 197, New York, NY, USA, IEEE, US, Jun. 8, 1997, pp. 1212–1217.

* cited by examiner

Primary Examiner—Stephen Chin
Assistant Examiner—Harry Vartanian

(57) ABSTRACT

In a method of discriminating a received spread spectrum signal among a number of received spread spectrum signals that are transmitted over a transmission channel, the received spread spectrum signal is despread, thereby using a locally generated pseudo noise sequence with a given phase offset. The despread received spread spectrum signal is quantized so as to obtain a probability mass function estimate of the despread received spread spectrum signal. A difference is determined between the probability mass function estimate and a true probability mass function that corresponds to a transmitted spread spectrum signal before transmission over the transmission channel. The difference is accumulated over a given number of symbols so as to obtain a statistic of the received spread spectrum signal. If the statistic fails a test against a given threshold, the received spread spectrum signal is rejected. Otherwise, the statistic is accepted.

20 Claims, 2 Drawing Sheets

SIGNAL DISCRIMINATOR FOR A SPREAD SPECTRUM SYSTEM

BACKGROUND OF THE INVENTION

1. Field of the Invention

The present invention relates to a method of discriminating a received spread spectrum signal among a plurality of received spread spectrum signals, more particularly to determine whether or not to accept such a received spread spectrum signal on the basis of a determined statistic thereof. Such a method is particularly useful in pilot searchers of spread spectrum devices that are used in a cellular Code Division Multiple Access(CDMA) system, but the method can also be used in numerous other spread spectrum systems where there is a need to discriminate spread spectrum signals.

2. Description of the Related Art

In CDMA systems, pilot searchers are comprised in handsets. In a so-called acquisition phase, such pilot searchers search for spread spectrum pilot signals that are transmitted by radio base stations. Because such handsets typically receive pilot signals from different base stations, there is a need to discriminate a pilot signal transmitted by a particular base station. In known CDMA system, such discrimination is done by determining the total energy of the pilot signal as received by the handset. Rejection or acceptation of a pilot signal is done by comparing a statistic obtained from the received pilot signal presently under investigation with a threshold. The higher the total received energy, the higher is the value of the statistic. Therefore, to obtain predetermined probabilities of detection and false alarm when detecting pilot signals of different energies, the threshold needs to be variable.

SUMMARY OF THE INVENTION

It is an object of the invention to provide a simple and effective spread spectrum signal discrimination method.

In accordance with the invention, a method of discriminating a received spread spectrum signal among a plurality of received spread spectrum signals that are transmitted over a transmission channel is provided, said method comprising:

despreading said received spread spectrum signal, thereby using a locally generated pseudo noise sequence with a given phase offset;

quantizing said despread received spread spectrum signal so as to obtain a probability mass function estimate of said despread received spread spectrum signal;

determining a difference between said probability mass function estimate and a true probability mass function corresponding to a transmitted spread spectrum signal before transmission over said transmission channel, said transmitted spread spectrum signal having been generated using a pseudo noise sequence that corresponds to said locally generated pseudo noise sequence with said given phase offset;

accumulating said difference over a predetermined number of symbols conveyed by said transmitted spread spectrum signal so as to obtain a statistic of said received spread spectrum signal; and rejecting said received spread spectrum signal if said statistic fails a test against a given threshold, and accepting said received spread spectrum signal if said statistic passes said test.

The invention has the great advantage that no estimate of the total energy of the received spread spectrum signal is needed to discriminate the received spread spectrum from other received spread spectrum signal. The invention if based upon the insight due to quantization and difference determination, the threshold can be a fixed threshold. This particularly is a great advantage when implementing the method in a pilot searcher of pilot signals transmitted by base stations of a cellular CDMA system. In CDMA systems that use modulation methods such as QPSK modulation, the quantizer and the difference determiner are quadrature arrangements, both in-phase and quadrature signals containing useful information after despreading.

Difference determination can be done through a J-divergence cost function, particularly through Kullback-Leibler distance computation, quantities well-known in mathematics, through determination of mutual information, a quantity well-known in information theory, or any other suitable method to determine the difference between probability mass functions.

In case of CDMA pilot signal searching of pilot signals transmitted by base stations, the search method can be a multi-dwell search method.

BRIEF DESCRIPTION OF THE DRAWING

Throughout the figures the same reference numerals are used for the same features.

DESCRIPTION OF THE DETAILED EMBODIMENTS

Figure 1:
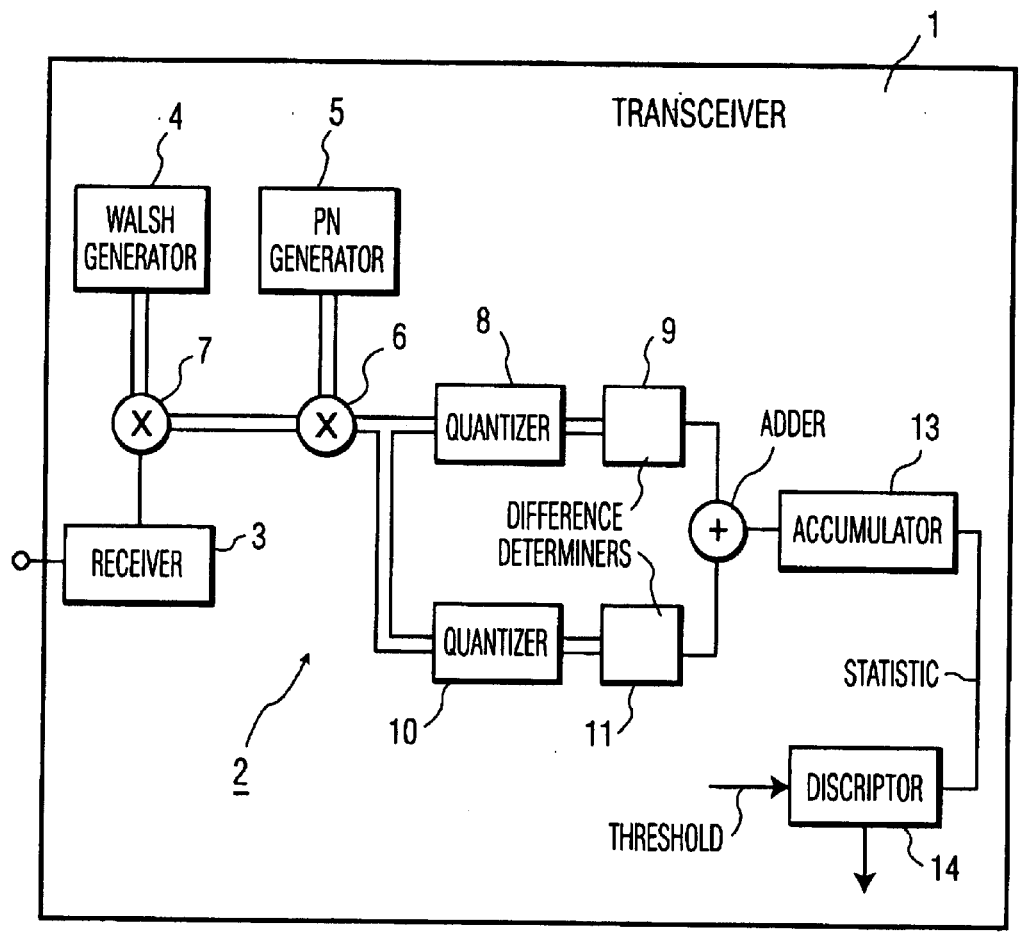
FIG. 1 is a block diagram of a spread spectrum transceiver according to the invention.

FIG. 1 is a block diagram of a spread spectrum transceiver 1 according to the invention. The transceiver comprises a transmitter arrangement (not shown in detail), and a receiver arrangement 2. In a receiving only apparatus, there is no transmitter arrangement. The receiver arrangement 2 comprises a receiver 3 that receives, a spread spectrum signal that is transmitted by another transmitter over a transmission channel. In a receiving part of the transceiver 1, the received spread spectrum is discriminated among a plurality of received spectrum signals. The transceiver 1 may be incorporated in a CDMA cellular handset, or in any other spread spectrum device where there is a need to discriminate spread spectrum signals. Typically, the transmission channel is a wireless channel. But the invention is not limited to such a wireless channel. In principle, the transmission channel may be any channel between a transmitter and receiver that carries multiple spread spectrum channels and that affects a transmitted signal. In the example given, the transceiver 1 is comprised in a CDMA system in which a transmitted spread spectrum signal that is to be discriminated is generated using a pseudo noise sequence with a given phase offset. Such a signal may be a pilot signal generated by a radio base station comprised in the CDMA system. Typically, the receiver arrangement simultaneously receives such pilot signals from a number of base stations when roaming through the CDMA system. In one CDMA system, different pilot signals of different base stations are generated using the same pseudo noise sequence, though with a different offset. In other CDMA systems, multiple pseudo noise sequences may be used. In all such CDMA systems in which a CDMA handset receives multiple pilot signals from multiple base stations, in a so-called acquisition phase, the handset should be able to select the best pilot signal, in known systems typically being determined through signal strength measurements. In CDMA handsets, a pilot searcher performs pilot signal discrimination and selection. In one CDMA system, QPSK (Quadrature Phase Shift Keying) modulation/demodulation is applied. QPSK or similar quadrature modulation methods may be applied. In that case the receiver arrangement has so-called in-phase and quadrature signal detection branches. In principle, other modulation/demodulation methods may be applied not requiring quadrature modulation/demodulation. In the example given, quadrature modulation/demodulation is applied. The receiver arrangement comprises a Walsh generator 4, and a pseudo noise (PN) generator 5 that locally generates a complex pseudo noise sequence that corresponds to the pseudo noise sequence with the given offset. For other spread spectrum signals than pilot signals, the Walsh generator 4 locally generates a complex Walsh sequence. The pilot searcher searches for different base stations, or for different paths of the same base station, by setting the phase offsets to a priori known values. The receiver arrangement has a multiplier 6 of which an input is coupled to the PN generator 5 and of which another input is coupled to the receiver 3. The locally generated pseudo noise sequence despreads the received spread spectrum signal. Spread spectrum signals other than pilot signals are also despread by a multiplier 7 to which the complex Walsh sequence and the received signal are supplied. The receiver arrangement further comprises, in an in-phase branch, a quantizer 8 and a difference determiner 9, and, in a quadrature branch, a quantizer 10 and a difference determiner 11. An adder 12 adds respective output signals of the difference determiners 9 and 11. To obtain a statistic of the received spread spectrum signal, an accumulator 13 accumulates determined differences over a predetermined number of symbols conveyed by the transmitted signal as received by the receiving arrangement over the transmission channel. A true probability mass function (PMF) corresponds to the transmitted spectrum signal, before being transmitted over the transmission channel. The quantizers 8 and 10 provide samples, say N samples, N being an integer, that are used in the respective in-phase (I-) and quadrature (Q-) branches to form a probability mass function of the despread spread spectrum signal. In principle, any valid probability density function, when quantized into a few bins produces a probability mass function. The outcome of the PMF estimate depends on the received spread spectrum signal and the number of quantization bins. Due to noise, the PMF estimate deviates from the true PMF. The difference determiners 9 and 11 may apply various techniques to determine the difference between a PMF estimate and a true PMF. To determine the difference, a so-called J-divergence cost function may be applied, one example of such a J-divergence cost function being the so-called Kullback-Leibler distance. As such, J-divergence cost functions and the Kullback-Leibler distance are well known in the art of mathematics and information theory. In information theory terms, the Kullback-Leibler distance is a quantity that measures the difference between two distributions, the more similar the distributions, the smaller the Kullback-Leibler distance. The Kullback-Leibler (KL) distance between distributions P=[P0, P1] and Q=[Q1, Q2], P0, P1, Q1 and Q2 being distribution probabilities, is KL(P| |Q)=P0*log(P0/Q0)+ P1*log(P1/Q1). From a computational point of view, the KL distance is easy to compute. Another technique to determine the distance between the true PMF and the PMF estimate uses the well-known quantity in information theory, mutual information. Mutual information provides a measure of dependency between two PMFs. For mutual information being zero, two PMFs are completely independent. The higher the mutual information between two PMFs, the more similar they are. The receiver arrangement further comprises a discriminator 14 for discriminating the received spread spectrum signal, in the example given the pilot signal presently being searched for by the CDMA handset. The discriminator 14 may be a comparator or any other suitable device of software routine that is able to determine whether or not the determined statistic or fails a test against a given threshold. In case of discriminating a base station through discrimination of its pilot signal, the base station is deemed to have been found, i.e., is found to exist, if the statistic fails the test and is deemed not detected if the statistic passes the test. In case of a comparator, the base station is found to exist at the given offset if the determined statistic is below a given threshold, and is deemed not detected otherwise. The searcher advances the phase offset to discriminate other base stations, or other paths of the same base station. The pilot searcher may be multi-dwell searcher. Such a multi-dwell searcher applies at least two passes, at different thresholds that represent different detection probabilities of detecting pilot signals. In a first pass, at a given threshold setting, a number of pilot signal candidates is selected, and in at least a second pass, the threshold is set to detect such candidate pilot signals with a higher detection probability, so that such candidate pilot signals can be discriminated more reliably. A great advantage of the invention is that, in at least a single search pass, the threshold can be made fixed. This is due to the fact that there is no dependence of total received energy of the received spread spectrum signal. On the other hand, the threshold can still be made variable so as to take into account different integration lengths in the accumulator 13. Such different integration lengths can be set to achieve a faster search or to mitigate the effects of too much frequency offset. In case of other spread spectrum signals than pilot signals to be discriminated, an estimate of the true probability mass function may need to be made, from received training symbols. In principle, such an estimate is not needed for the true probability mass function of a pilot signal since the symbols in a pilot signal are known a priori.

Figure 2:
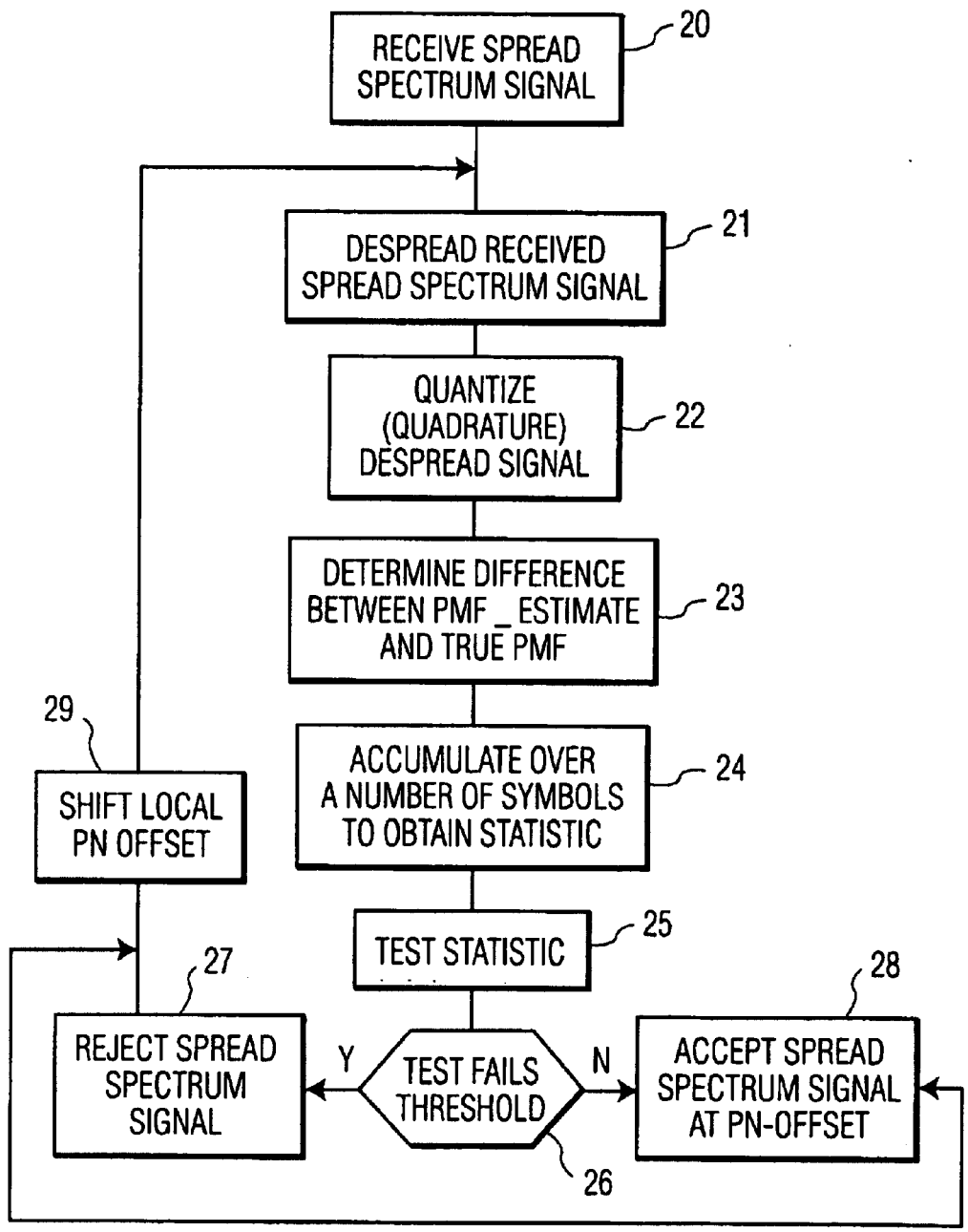
FIG. 2 is a flow-chart illustrating a method according to the invention.

FIG. 2 is a flow-chart illustrating a method according to invention. In block 20, spread spectrum signal is received among a plurality of received spread spectrum signals that are transmitted over a transmission channel. In block 21, the received spread spectrum signal is despread, thereby using a locally generated pseudo noise sequence with a given phase offset. In block 22, in quadrature, the despread received spread spectrum signal is quantized so as to obtain a probability mass function estimate of the despread received spread spectrum signal. In block 23, a difference is determined between the probability mass function estimate and a true probability mass function that corresponds to a transmitted spread spectrum signal before transmission over said transmission channel. The transmitted spread spectrum signal has been generated using a pseudo noise sequence that corresponds to the locally generated pseudo noise sequence with said given phase offset. In block 24, the difference is accumulated over a number of symbols conveyed by said transmitted spread spectrum signal so as to obtain a statistic of the received spread spectrum signal. In block 25, the obtained statistic is tested. In block 26, it is checked whether the statistic fails a test against a given threshold. If the statistic fails the test, in block 27, the received spread spectrum signal is rejected. If the statistic passes the test, in block 28, at a set local PN-offset, the received spread spectrum signal is accepted. In block 29, in either case of rejecting or accepting the received spread spectrum signal, the set-local PN-offset is shifted to another PN-offset. Upon such shifting, resumed is at block 21.

In view of the foregoing it will be evident to a person skilled in the art that various modifications may be made within the spirit and the scope of the invention as hereinafter defined by the appended claims and that the invention is thus not limited to the examples provided. The word "comprising" does not exclude presence of other elements or steps than those listed in a claim.

What is claimed is:

1. A method of discriminating a received spread spectrum signal among a plurality of received spread spectrum signals that are transmitted over a transmission channel, said method comprising the steps:

despreading said received spread spectrum signal, thereby using a locally generated pseudo noise sequence with a given phase offset;

quantizing the despread received spread spectrum signal so as to obtain a probability mass function estimate of the despread received spread spectrum signal;

determining a difference between said probability mass function estimate and a true probability mass function corresponding to a transmitted spread spectrum signal before transmission over said transmission channel, said transmitted spread spectrum signal having been generated using a pseudo noise sequence that corresponds to said locally generated pseudo noise sequence with said given phase offset;

accumulating said difference over a predetermined number of symbols conveyed by said transmitted spread spectrum signal so as to obtain a statistic of said received spread spectrum signal; and rejecting said received spread spectrum signal if said statistic fails a test against a given threshold, and accepting said received spread spectrum signal if said statistic passes said test.

2. The method as claimed in claim 1, wherein said difference is a J-divergence cost function.

3. The method as claimed in claim 1, wherein said difference is a Kullback-Leibler distance.

4. The method as claimed in claim 1, wherein said difference is mutual information.

5. The method as claimed in claim 1, wherein said test comprises comparison of said statistic with said threshold, said statistic passing said test if said statistic is below said threshold, and said statistic failing said test if said statistic is above said threshold.

6. The method as claimed in claim 1, wherein said quantizing and said difference determining is done in quadrature, wherein said method further comprises the step:

summing the quadrature determined differences.

7. The method as claimed in claim 1, wherein said received spread spectrum signal is a pilot signal, and said method is a pilot signal searching method.

8. The method am claimed in claim 7, wherein said pilot signal is transmitted by a base station of a cellular Code Division Multiple Access(CDMA) system.

9. The method as claimed in claim 7, wherein said pilot signal searching method is a multi-dwell searching method.

10. The method as claimed in claim 1, wherein said given threshold is a fixed threshold that is independent of a value of said statistic.

11. A receiver device comprising:

a receiver for receiving a spread spectrum signal;

a despreader that is configured to despread the received spread spectrum signal, thereby using a locally generated pseudo noise sequence with a given phase offset generated by a pseudo noise generator comprised in said receiver;

a quantizer that is configured to quantize the despread received spread spectrum signal so as to obtain a probability mass function estimate of the despread received spread spectrum signal;

a difference determiner that is configured to determine a difference between said probability mass function estimate and a true probability mass function corresponding to a transmitted spread spectrum signal before transmission over a transmission channel, said transmitted spread spectrum signal having been generated using a pseudo noise sequence that corresponds to said locally generated pseudo noise sequence with said given phase offset;

an accumulator that is configured to accumulate said difference over a predetermined number of symbols conveyed by said transmitted spread spectrum signal so as to obtain a statistic of the received spread spectrum signal; and a discriminator that is configured to discriminate the received spread spectrum signal among a plurality of received signals, said discriminator being arranged to reject the received spread spectrum signal if said statistic fails a test against a given threshold, and to accept the received spread spectrum signal if said statistic passes said test.

12. The receiver device as claimed in claim 11, wherein said difference is a J-divergence cost function.

13. The receiver device as claimed in claim 11, wherein said difference is a Kullback-Leibler distance.

14. The receiver device as claimed in claim 11, wherein said difference is mutual information.

15. The receiver device as claimed in claim 11, wherein said test comprises a comparison of said statistic with said given threshold, said statistic passing said test if said statistic is below said given threshold, and said statistic failing said test if said statistic is above said given threshold.

16. The receiver device as claimed in claim 11, wherein said quantizer is a quadrature quantizer, and said difference determiner is a quadrature difference determiner, and wherein said receiver device further comprises a summer that is configured to add quadrature output signals of said quadrature difference determiner.

17. The receiver device as claimed in claim 11, wherein the received spread spectrum signal is a pilot signal, and said quantizer, said difference determiner, said accumulator and said discriminator form a pilot signal searcher.

18. The receiver device as claimed in claim 17, wherein said pilot signal is transmitted by a base station of a cellular Code Division Multiple Access(CDMA) system.

19. The receiver device as claimed in claim 17, wherein said pilot signal searcher is a multi-dwell searcher.

20. A transceiver with a transmitter arrangement and a receiver arrangement, said receiver arrangement comprising:

a receiver for receiving a spread spectrum signal;

a despreader that is configured to despread the received spread spectrum signal, thereby using a locally generated pseudo noise sequence with a given phase offset generated by a pseudo noise generator comprised in said receiver;

a quantizer that is configured to quantize the despread received spread spectrum signal so as to obtain a probability mass function estimate of the despread received spread spectrum signal;

a difference determiner that is configured to determine a difference between said probability mass function estimate and a true probability mass function corresponding to a transmitted spread spectrum signal before transmission over a transmission channel, said transmitted spread spectrum signal having been generated using a pseudo noise sequence that corresponds to said locally generated pseudo noise sequence with said given phase offset;

an accumulator that is configured to accumulate said difference over a predetermined number of symbols conveyed by said transmitted spread spectrum signal so as to obtain a statistic of the received spread spectrum signal; and a discriminator that is configured to discriminate the received spread spectrum signal among a plurality of received signals, said discriminator being arranged to reject the received spread spectrum signal if said statistic fails a test against a given threshold, and to accept the received spread spectrum signal if said statistic passes said test.

* * * * *